Feb. 12, 1952 N. FELICI Re. 23,460

ELECTROSTATIC MACHINE

Original Filed March 16, 1948 3 Sheets-Sheet 1

Noel Felici
by his attys
Stebbins Blenko & Webb

ELECTROSTATIC MACHINE

Original Filed March 16, 1948 3 Sheets-Sheet 2

Noel Felici
by his attys
Stebbins Blanchard & Miller

Feb. 12, 1952 N. FELICI Re. 23,460
ELECTROSTATIC MACHINE
Original Filed March 16, 1948 3 Sheets-Sheet 3
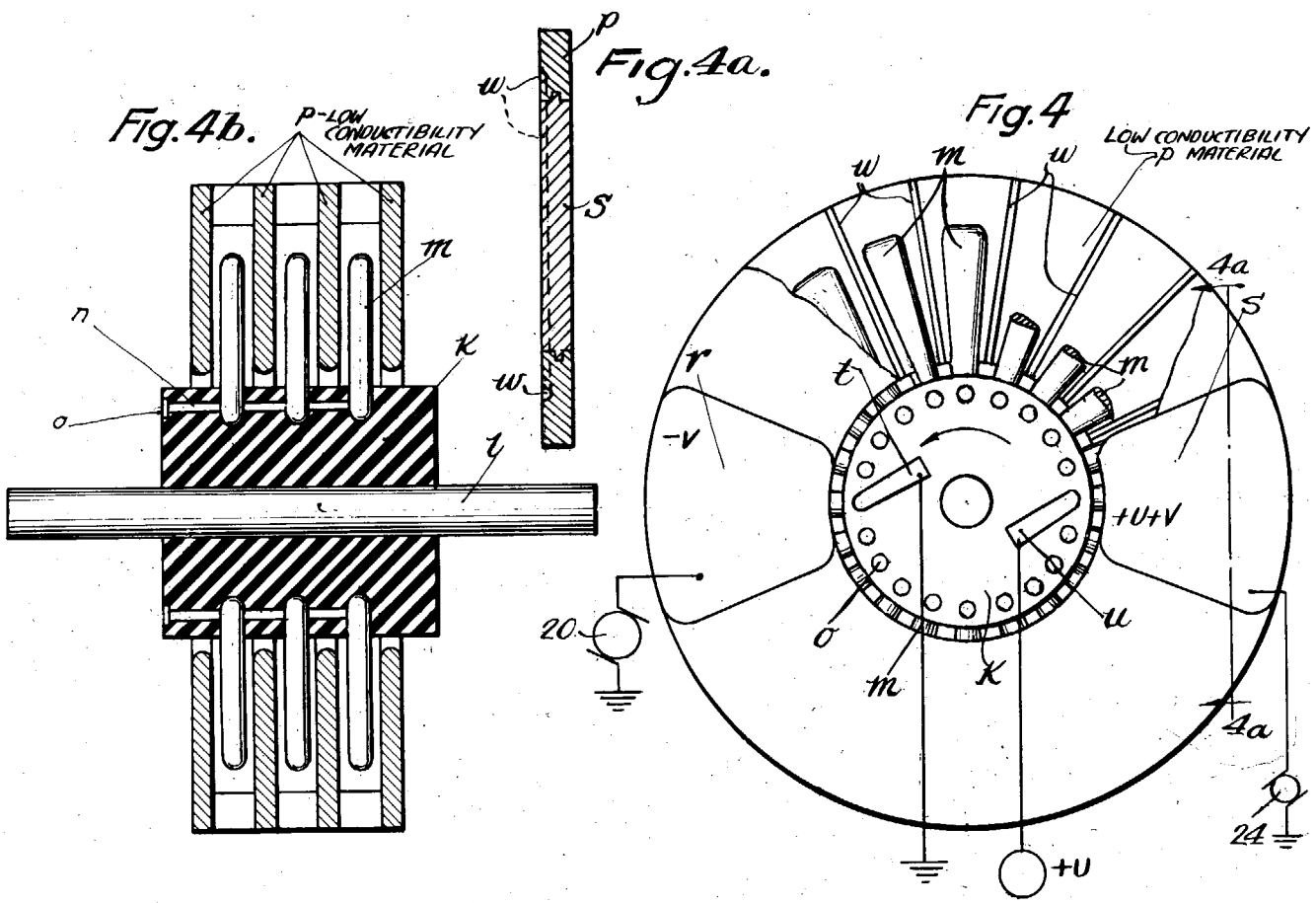
Noel Felici
by his atty.
Stebbins Blanke & Webb Reissued Feb. 12, 1952 Re. 23,460

UNITED STATES PATENT OFFICE 23,460

ELECTROSTATIC MACHINE

Noël Felici, Grenoble, France, assignor to Centre National de la Recherche Scientifique, Paris, France, a corporation of France Original No. 2,542,494, dated February 20, 1951, Serial No. 15,070, March 16, 1948. Application for reissue November 21, 1951, Serial No. 257,441. In France March 21, 1947

19 Claims. (Cl. 171—329)

Matter enclosed in heavy brackets [ ] appears in the original patent but forms no part of this reissue specification; matter printed in italics indicates the additions made by reissue.

The present invention relates to electrostatic motors and generators, more particularly of the type which comprises conducting movable members.

In my copending application Serial No. 646,737 filed February 11, 1946, Patent No. 2,486,140, issued October 25, 1949, I have disclosed that in electrostatic machines with conducting movable members the useful electric forces acting upon said movable members are proportioned to the "main frame" of the active parts of these members and that it is advantageous to give to said "main frame" a substantial area, allowance being made for the other characteristic features of the machine.

In the electrostatic machines with conducting movable members hitherto built the movable members are mostly constituted by flat pieces of substantial face surface forming with the stationary members condensers which are similar to plate condensers. It results therefrom that even though in accordance with the proposals of the above mentioned application Serial No. 646,737 the conducting movable members are given a sufficient "main frame" surface to obtain the best results, this "main frame" surface generally remains small with respect to the total surface of a movable member. Exerted on the plane faces of a flat conducting movable member are only electric forces which do not directly perform work since they are perpendicular to the movement of said member while the usual forces are exerted only upon its edge face. It is thus evident that the surface of such a conducting movable member is not well utilized in its whole extent for developing work since the electric forces which are exerted on the major part of this surface yield no work during the movement of the movable members and thus do not contribute to the energy conversion process.

The object of the present invention is to provide an electrostatic machine with conducting movable members, capable of working as a motor or as a generator, the movable members of which are shaped in such a manner that the greatest possible part of their surface may be influenced by useful electric forces in order that the surface of the "main frame" may be a large part of the total surface of the member instead of being much smaller.

In the machine according to the invention the conducting movable members are in the shape of long bars the long dimension of which is perpendicular to the direction of displacement of said members. The outline of the cross section of these bars is of continuous convex curvature and the thickness thereof, measured between two planes tangent to the cross section outline of a bar and parallel with the direction of displacement of the latter, is preferably substantially equal to twice the distance between a movable member and each stationary member electrically influencing the latter when the movable members are influenced on both sides, and equal to said distance when the movable members are influenced on one side only. When given such a thickness the said bars are submitted to the highest possible useful electric forces.

The cross-section of the bars, which may be constant or variable along each bar, may be, for instance, circular, elliptical, oval, or substantially such.

The stator may also be formed of similar bar-shaped stationary members.

Various other features of the machine according to the invention appear in the following description of embodiments of such a machine, reference being had to the appended drawings in which:

Fig. 4 is a diagrammatical end view of a machine comprising a rotor according to Figure 3 with parts broken away to show the radial bars.

Fig. 4a is a section taken on line 4a—4a of Fig. 4.

Fig. 4b is a diagrammatical sectional view of the machine in the vertical diametral plane of Fig. 4.

Figure 1:
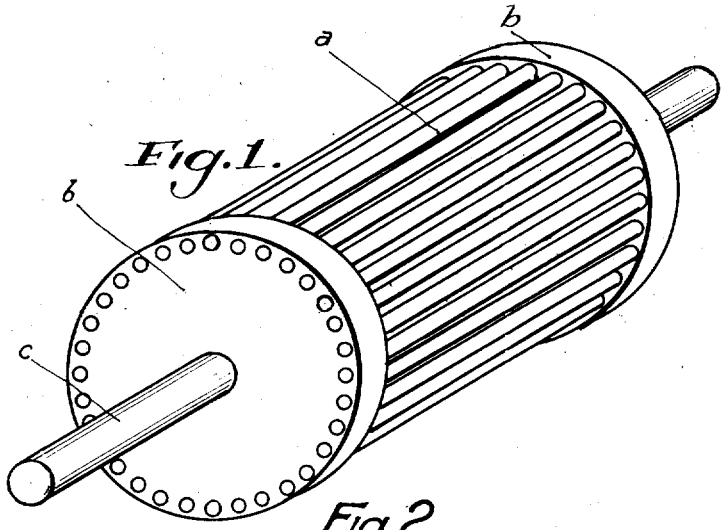
Fig. 1 is a perspective view showing the rotor of a machine of the "squirrel cage" type.

The rotor shown in Fig. 1 comprises bars a of circular cross section arranged at the periphery of a circular cylinder and maintained by two insulating cheeks b secured to the rotating shaft c, the whole forming a kind of squirrel cage.

Figure 3:
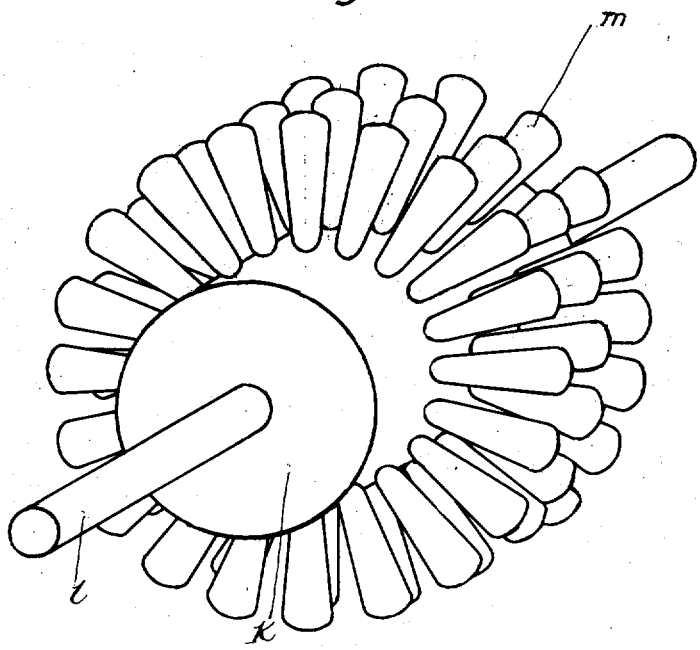
Fig. 3 is a perspective view showing a rotor in which the bars are arranged radially.

Fig. 3 shows the rotor of an electrostatic machine formed of bars m of variable section arranged radially in three rows on an insulating core k through which passes the rotating shaft l.

It is evident that in such devices the "main frame" surfaces of the movable conducting members are multiplied to the maximum considering the bulk of the said members and that since the useful electric forces can be increased in proportion the specific power, that is, the power per unit of volume, of the machine may be considerably higher than that of a similar machine requiring the same space and working in a fluid medium having the same electrostatic pressure and in which the invention has not been applied.

Figure 5:
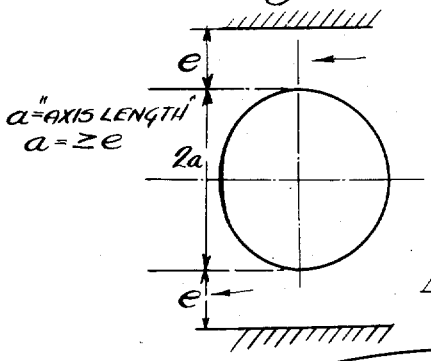
Figs. 5, 6 and 7 show various possible shapes of the cross sections of the movable or stationary conducting members.

The cross-section of the bars which constitute the movable members may advantageously be circular, elliptical with the short axis parallel to the direction of the movement, the ratio of the axes being comprised between two and one, elliptical with the long axis parallel to the direction of the movement, the ratio of the axes being comprised between one and two, oval with the axis of symmetry parallel to the direction of the movement, and the part having the highest curvature which lies on said axis being in the rear of the profile when the machine works as a generator (Fig. 5). The short and long axes of the ellipse above referred to respectively are the distances from the center of the ellipse to the points of least and greatest curvature of the outline of the ellipse.

Figure 6:
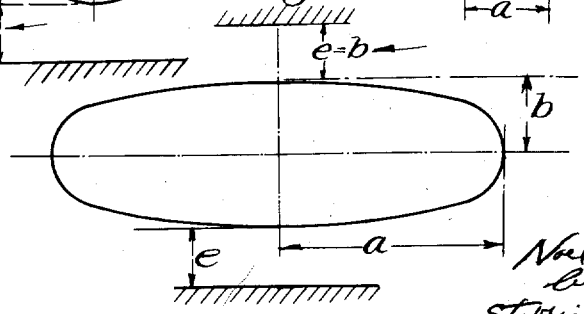

When the cross-section is flattened in the direction of the movement i. e. when the shorter axis is parallel to said direction, it is generally advantageous to use bars with a cross-section close to an ellipse. When the profile is elongated in the direction of the movement, i. e. when the shorter axis is perpendicular to said direction, it is generally advantageous to use bars with a cross-section similar to an ellipse but differing therefrom by the following points; the radius of curvature instead of being as in the ellipse equal to $b^2/a$ at the apex of the long axis (a and b designating the long axis and the short axis respectively) has a higher value and is higher than $0.75 \cdot b$ when a/b is comprised between one and two and higher than $0.65 \cdot b$ when a/b is comprised between two and three. When following the periphery of the cross-section while starting from the apex of the long axis the radius of curvature first increases very slowly then more rapidly and reaches at the apex of the short axis a value which is higher than the expression $a^2/b$ corresponding to the ellipse having the same axes (Fig. 6).

Figure 7:
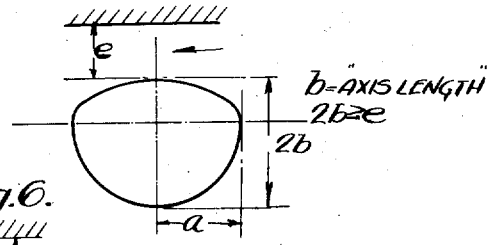

When the arrangement of the stationary with respect to the movable members of the electrical device is not symmetric as it occurs, for instance, in the case of the squirrel cage rotor shown at Fig. 1 where the stationary members which influence the bars can be arranged on one side only of the latter it may be of advantage to use bars the cross-section of which is not symmetrical with respect to a plane parallel to the direction of movement of said bars (Fig. 7).

In a general manner, it has been found that in order to work out the invention in the best conditions it is advisable to use cross-sections in which the ratio of the "axes-length" is not higher than three, the expression "axes-length" meaning half of the distance between two parallel lines drawn in the plane of the cross-section and externally tangent to the latter, the direction of the said lines being parallel to that of the movement for one of the axes and perpendicular for the other.

In order that bars having a given profile should be submitted to the highest possible useful electric forces it is desirable to confer to the said bars an electric charge of a certain value and to cause to act upon them an electric field parallel to the direction of movement and of a convenient intensity. The value of the charge and the intensity of the field may vary within certain limits around optimum values which, more particularly, depend on the chosen cross-section. These values may be obtained, in each case, through a study of the electric field in the neighbourhood of the bars, which study can be made by known means such as mathematical, graphical or other means, taking into account the fact that the electric field must not exceed the limit corresponding to the dielectric strength of the fluid medium in which the machine works. Generally speaking, the optimum value of the average electric field parallel to the direction of movement of the bars is near $$0.5\ Em \cdot \frac{a}{a+b}$$

Em being the maximum admissible electric field in the dielectric fluid medium which surrounds the bars, b the axis of the profile perpendicular to the movement and a the axis parallel to the movement.

The optimum charge to be given to a bar per centimetre of length is generally near $$A \times \epsilon \times E_m \times b$$

$\epsilon$ being the dielectric constant of the fluid medium which surrounds the bars and A a numerical coefficient, all the values being expressed in this formula in mechanical and electrostatic c. g. s. units. The coefficient A is near 0.25 for cross-sections approaching the circle or flattened in the direction of the movement (short axis parallel to the movement). For cross-sections which are elongated in the direction of the movement (long axis parallel to the movement) it increases with the elongation of the cross-section. It is near 0.30 for a/b=2 and 0.50 for a/b=3.

When the above data concerning the profile of the bars, the average electric field parallel to the movement and the charge of the bars are taken into account the shape index of the bars assumes high values, which are higher than 0.50 and may exceed 0.90. This shape index equals, for instance, 0.70 to 0.80 for cross-sections approaching the circle and 0.95 for an elliptical cross-section flattened in the direction of the movement, the ratio of the axes being about 1.6.

It is possible to depart, in a limited measure, from the above indicated optimum values and, for instance, to increase the charge of the bars provided the average electric field parallel to the movement is decreased simultaneously, and conversely.

Therefore, in the machines according to the invention, the intensity of the average field parallel to the movement may be an appreciable fraction of the maximum field Em, for instance a quarter of said maximum field when the bars are given a cross-section approaching the circle. The potential difference across the terminals may thus be very high, more particularly if the machine works in a fluid medium of high dielectric strength. If Em=200 kilovolts per centimetre, a value which is very easily obtained, the average field parallel to the movement may be close to 50 kilovolts per centimetre. The potential of one bar will thus vary substantially by 50 kilovolts for a displacement of one centimetre, that is to say that if said bar moves 20 centimetres from one pole of the machine to the other the potential difference between said poles may be 1,000 kilovolts. Thus, the present invention makes it possible to build electrastatic machines yielding exceptionally high voltages, for instance 10,000 kilovolts, while requiring much less space than the hitherto known electrostatic devices working in a medium with the same dielectric strength.

Charging of the bars and production of the electric field parallel to their movement may be obtained by means of any of the presently known devices. For instance, it is possible to submit the bars, at one point of their course, to the influence of a stationary conducting electrode brought to a voltage −V while the bars are for instance connected with the ground by means of brushes or combs. Each bar will thus take a charge which is practically equal to C.V., C being the capacity formed by said bar and the influencing electrode, provided the capacities of said bar taken with the members of the machine the potential of which is very different from V are of sufficiently small value. It is also possible to connect the bars with an auxiliary generator supplying a potential V while the stationary influencing electrode is connected with the ground.

In order that all the bars may be submitted, as far as possible, to useful electric forces it is desirable that they never should move idle between the poles of the machine but that they always convey charges of either sign. Any suitable devices may be used for this purpose. If, for instance, one pole of the machine has a positive potential U it will be possible to submit the bars while they are connected with said pole through suitable known means such as brushes or combs to the influence of a stationary electrode brought by suitable means to a potential U+V higher than U which will produce in the bars, through influence, a negative charge which they will carry away in their further movement and bring to another pole. It will also be possible to arrange a first brush connected with a stationary electrode surrounding the bars as far as possible, to which brush the said bars transmit the positive charge which they carry along with the potential U. The so supplied current I passes, before it reaches the receiver, through a resistor which causes a voltage drop V, the other end of the resistor the potential of which is U−V being connected with a second brush. When the bars come into contact with this brush they are still under the influence of the stationary electrode having the potential U and receive a negative charge. This arrangement makes it possible to avoid the auxiliary device which is indispensable to bring the stationary electrode to a potential U+V higher than the potential U of the pole but it leads to the necessity of dissipating the power V.I to no purpose while the power which is necessary for bringing the stationary electrode to the potential U+V may be rendered negligible through a good insulation.

In order to produce the average electric field parallel to the movement of the bars, stationary conductors may be arranged, which are brought to suitably stepped potentials to the influence of which the bars will be submitted during their movement. The stepping of the potentials may be obtained by means of potentiometers, auxiliary generators or auxiliary brushes. It will generally be advantageous to use, as stationary conductors, bars similar to or identical with the movable bars.

It will also be possible to use, as stationary electrodes, more or less thick layers of materials of very low conductibility, such as germanium, the surface of which is brought to a regularly progressively varying potential when a current passes through them, the said layers thus behaving like a potentiometer.

It has been found that it is advantageous, more particularly when the machine works in a medium having a high dielectric strength, not to give said layers a smooth, plane or cylindrical surface as has hitherto been done but to provide them with regularly cut grooves the direction of which is substantially perpendicular to that of the movement of the movable bars. These grooves should have a suitably rounded profile and a depth comparable with the length of the axis of the cross-section of the movable bars which is perpendicular to the movement. It is thus possible to avoid the sliding of the charges carried by the low conductibility layer under the action of the forces to which they are submitted, said forces being large since they are equal to those acting upon the movable bars owning to the equality of action and reaction. If the above mentioned precaution is not taken, edge discharges may readily occur on the layers owing to the sliding of the static charges which they carry.

The spacing between the movable conducting bars and the stationary device producing the electric field should be given a suitable value related to the dimensions of the cross-section of the said movable bars. When this spacing is too large the volume occupied by the machine is not well utilized; when it is too small the electric field varies greatly from one point to another of a same bar and since its maximum value is limited by the dielectric strength of the fluid medium the electric forces are thus reduced as well as the power of the machine.

Figure 2:
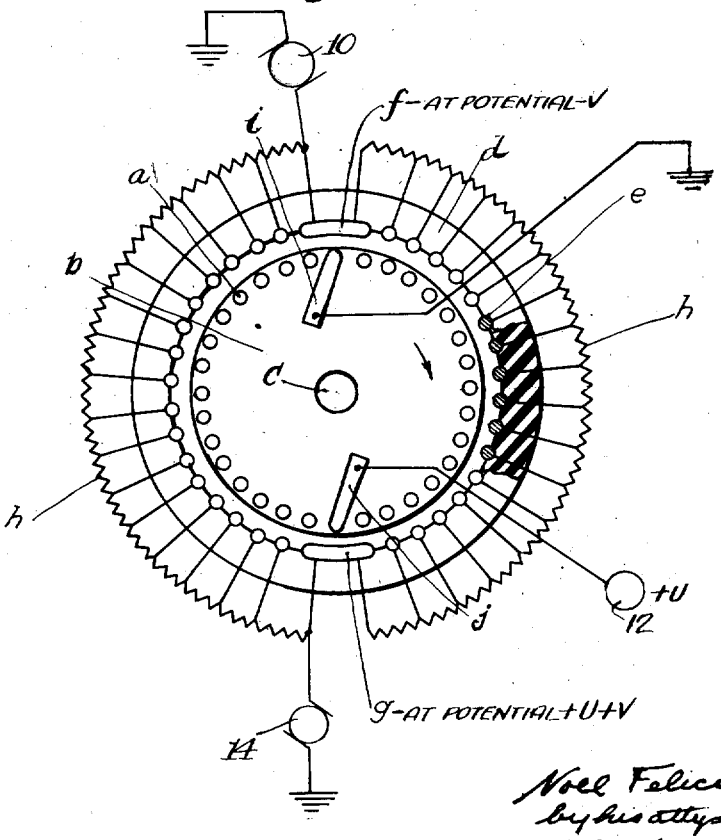
Fig. 2 is a diagrammatical end view of such a machine when looking from the brush side.

As above stated it is advantageous to give the spacing between the movable bars and the stationary members which create the electric field a value approaching that of the axis b of the cross-section of the bars, that is, in the case of an elliptical cross section [one half] the distance from the center to the point of least curvature or in a circular cross section the radius, when the latter are influenced on both sides by the stationary members (Figs. 3, 4 and 4b) and a value approaching 2b when the bars are influenced by the stationary members on one side only as it occurs, for instance, in the case of cylindrical squirrel cage rotors (Figs. 1 and 2).

As to the spacing between two consecutive movable bars it is advantageously comprised between b and 2b.

The two particular embodiments of the invention diagrammatically shown in the appended drawings will now be described more particularly.

Example I.—Squirrel cage machine

In this machine, which is shown in Figs. 1 and 2, the bars have a circular cross-section and are arranged on the periphery of a cylinder so as to form a squirrel cage.

The rotor which is shown alone in Fig. 1 is formed of two insulating flanges b secured to the shaft c of the machine and carrying circular section bars a. The stator (Fig. 2) comprises an insulating ring d provided on its internal face with grooves of semi-circular section in which are placed stationary conducting bars e of circular section. For charging and discharging the movable bars, the stator comprises, furthermore, two broader conducting members f, g spanning several of the bars a of the rotor. Resistors h are interposed between the successive stationary bars e, the later thus forming two continuous conducting chains extending from f to g and in which the potential varies from bar to bar progressively circumferentially along the internal surface of the stator.

Member f is brought by a suitable device, for instance an auxiliary generator 10, Fig. 2, to a potential —V, that is, a negative potential. When upon rotation of the rotor in the direction of the arrow, for example, a movable bar a passes in front of member f, it is grounded through a brush i and is given a positive charge Q. It carries away this charge in its further movement after contact with the brush i is broken while its potential increases progressively owing to the influence of the fixed bars e of increasing potential. When it arrives in front of member g the bar a is connected through a brush j with a terminal 12 at potential +U connected to the apparatus utilizing the generated current. Member g is brought by a suitable device such as an auxiliary generator 14 to a potential +U+V exceeding by V the potential +U of brush j. The progressive potentials of bars e are thus established. The bars a carry away after their contact with brush j a charge which is substantially equal to —Q and the potential of which progressively decreases while the bars move away from g and come nearer to f, said charge being finally transferred to ground through brush i.

With a rotor of 10 centimetres diameter carrying 30 bars of 10 centimetres length and 5 millicetres diameter a potential difference of 100 kilovolts was obtained between brushes i and j in air at atmospheric pressure; the current supplied was of 30 microamperes for a speed of rotation of 3,000 R. P. M., the power of the machine thus being 3 watts. In compressed air under a pressure of 6 atmospheres the voltage reached 500 kilovolts and the intensity 0.15 milliampere at the same speed, the power thus being 75 watts.

Example II.—Machine with radially arranged conducting members

In the machine shown in Figs. 3, 4 and 4b the movable conducting bars are arranged radially in a plurality of rows on the periphery of a cylindrical insulating hub.

The rotor which is shown alone in Fig. 3 is formed of an insulating cylinder or hub k carried by a shaft l and provided with three rows of conducting bars m the length of which is substantially equal to the radius of hub k. The cross-section of the conducting bars m varies progressively along said bars: at the end secured to the hub said section is an ellipse flattened in the direction of the movement, the axis parallel to the movement being the short axis, and the ratio of the axes being for example 1 to 2. In the direction outwardly along the bar towards the free end the axis which is perpendicular to the movement does not change while the other increases progressively so that the profile progressively becomes circular then lengthens in the direction of the movement. At the free end the profile is elliptical, the longer axis being parallel to the movement and the ratio of the two axes being substantially equal to 2 to 1. The bars are electrically connected in rows of three, as shown in Fig. 4b, by conducting rods n which pass through the insulating hub k. These rods terminate in contact keys o.

[In Fig. 4 only a few of bars m have been shown, the positions of the others being indicated in dot and dash lines in order to avoid crowding in the drawing.]

The stator as shown in Fig. 4b is formed of four plates p of low conducting material between which pass the movable conducting bars.

Said plates are provided with radial grooves w as shown in Fig. 4, the outside plate p being broken away to show also the bars m. Each of these plates p carries two flat metallic members r and s securing the charging and discharging of the movable conducting bars. Members r are brought by a suitable device, such as an exciter 20, to a potential —V, that is, a negative potential, while the movable bars m are grounded through a brush t when upon rotation of hub k, for example in the direction of the arrow, Fig. 4, they pass between said members r so that they are given a positive charge Q. They carry away this charge in their movement after breaking connection with brush t and their potential rises progressively owing to the influence of the lower stationary low conducting plates p. When the bars m pass between members s at the right of Fig. 4 they are brought into commuication through a brush u with a terminal at potential +U connected to the apparatus utilizing the generated current. By means such as an exciter 24 members s are brought to a potential +U+V exceeding by V the potential +U of brush u so that the bars *each* receive a charge [after breaking connection with brush u] which is substantially equal to —Q [, which]. *Each* charge *after the connection of the bar with brush u is broken is carried away by the bar and transferred* [they carry away and transfer] to brush t when *the bar is* further rotated into position to be connected to brush t.

With a rotor of 40 centimetres diameter carrying 90 bars of 10 centimeters length in which the axis perpendicular to the movement is 6 millimetres while the other axis varies radially along the bar from 5 to 12 millimetres a difference of potential of 200 kilovolts between brushes t and u was obtained in air at the atmospheric pressure; the current supplied was of 120 microamperes for a speed of rotation of 2,000 R. P. M., the power of the machine thus being around 24 watts. In compressed air under a pressure of 10 atmospheres a potential difference of 1,200 kilovolts was obtained between t and u with a current of 0.7 milliampere, the power thus being 840 watts.

What I claim is:

1. An electrostatic machine with movable conductive conveyor members influenced electrically on both sides by stationary conductive inductor members, in which said movable members are formed of elongated conducting bars having a cross section of continuously convex outline transverse to the length thereof and insulated from one another and the longitudinal axis of which is perpendicular to the direction of their displacement, the thickness of each bar measured between two planes tangent to said bar and parallel to the direction of displacement of the bar being substantially equal to twice the distance between a bar and the stationary members influencing the same.

2. An electrostatic machine with movable conductive conveyor members influenced on one side only by stationary conductive inductor members, in which said movable members are formed of elongated conducting bars having a cross section of continuously convex outline transverse to the length thereof and insulated from one another and the longitudinal axis of which is perpendicular to the direction of their displacement, the thickness of each bar measured between two planes tangent to said bar and parallel to the direction of displacement of the bar being substantially equal to the distance between a bar and the stationary member which influences the same.

3. An electrostatic machine comprising at least two main conductive inductor members supported in spaced relation to each other, a conductive conveyor member, said inductor members as a unit and said conveyor member being supported for movement relative to each other in inductive relation to each other, said conveyor member being of elongated form with the length thereof extending in the direction transverse to the direction of relative movement of said members and having a cross section transverse to the said length thereof the circumferential outline of which enclosing said cross section is of continuously convex curvature, an auxiliary inductor member supported in the space between said main inductor members adjacent the path of relative movement of said main inductor members and said conveyor member and in inductive relation to said conveyor member, said conveyor member being continuously insulated from said inductor members, means for maintaining said main inductor members at substantially different potentials, means for maintaining said auxiliary inductor member at an intermediate potential, a discharge terminal, an auxiliary terminal, means for connecting said auxiliary terminal to said conveyor member at the position in which said conveyor member is adjacent said main inductor member of lower potential, and means for connecting said discharge terminal to said conveyor member at the position in which said conveyor member is adjacent said main inductor member of higher potential.

4. An electrostatic machine comprising at least two main conductive inductor members supported in spaced relation to each other, a conductive conveyor member, said inductor members as a unit and said conveyor member being supported for movement relative to each other in inductive relation to each other, said conveyor member being of elongated form with the length thereof extending in the direction transverse to the direction of relative movement of said members and having a cross section transverse to the said length thereof the circumferential outline of which enclosing said cross section is of continuously convex curvature, a plurality of auxiliary conductive inductor members supported in the space between said main conductive inductor members adjacent the path of relative movement of said main inductor members and said conveyor member and in inductive relation to said conveyor member, said conveyor member being continuously insulated from said inductor members, means for maintaining said inductor members at substantially different potentials, means for maintaining said auxiliary inductor members at potentials varying from one to the other progressively between the potentials of said main inductor members, a discharge terminal, an auxiliary terminal, a brush connected to said auxiliary terminal and supported for connection with said conveyor member at the position in which said conveyor member is adjacent said inductor member of lower potential, and a brush connected to said discharge terminal and supported for connection with said conveyor member at the position in which said conveyor member is adjacent said main inductor member of higher potential for discharge to said higher potential terminal of the charge induced upon said conveyor.

5. An electrostatic machine comprising a rotor supported for rotation upon an axis, at least two main conductive inductor members supported in spaced relation to each other circumferentially about said axis, a conductive conveyor member carried by said rotor for movement thereof as said rotor rotates and in inductive relation successively to said inductor members, said conveyor member being of elongated form with the length thereof extending transversely of the circumferential direction of movement of said conveyor member, said conveyor member having a cross section transverse to said length thereof the circumferential outline of which enclosing said cross section is of continuously convex curvature, a plurality of auxiliary inductor members respectively disposed at opposite sides of said axis between said main inductor members adjacent the path of movement of said conveyor member and in inductive relation thereto, said conveyor member being continuously insulated from said inductor members, means for maintaining said main inductor members at substantially different potentials, means for maintaining said auxiliary inductor members respectively at potentials varying progressively between the potentials of said main inductor members, a discharge terminal, an auxilary terminal, means for connecting said auxiliary terminal to said conveyor member at the position in which said conveyor member is adjacent said inductor member of lower potential, and means for connecting said discharge terminal to said conveyor member at the position in which said conveyor member is adjacent said main inductor member of higher potential.

6. An electrostatic machine as defined in claim 4 which comprises resistors connecting said auxiliary inductor members in series with each other and with said main inductor members to provide a potential gradient upon said auxiliary inductor members extending between the potentials of said main inductor members.

7. An electrostatic machine comprising at least two main conductive inductor members supported in spaced relation to each other, a conductive conveyor member, said inductor members as a unit and said conveyor member being supported for movement relative to each other in inductive relation to each other, said conveyor member being of elongated form with the length thereof extending in the direction transverse to the direction of relative movement of said members and having a cross section transverse to the said length thereof the circumferential outline of which enclosing said cross section is of continuously convex curvature, an auxiliary inductor member supported in the space between said main inductor members adjacent the path of relative movement of said main inductor members and said conveyor member and in inductive relation to said conveyor member, said conveyor member being continuously insulated from said inductor members, means for maintaining said main inductor members at substantially different potentials, said auxiliary inductor member being in contact with and continuous between said main inductor members and being formed of a material of low conductibility capable of providing a potential gradient therethrough substantially equal to the difference of potential between said main inductor members, a discharge terminal, an auxiliary terminal, means for connecting said auxiliary terminal to said conveyor member at the position in which said conveyor member is adjacent said main inductor member of lower potential, and means for connecting said discharge terminal to said conveyor member at the position in which said conveyor member is adjacent said main inductor member of higher potential.

8. An electrostatic machine as defined in claim 7 in which said auxiliary inductor member provides a generally continuous surface parallel to the direction of movement of said conveyor member, said surface being formed with grooves therein extending along said surface in the direction perpendicular to the direction of relative movement of said conveyor and said main inductor members.

9. An electrostatic machine comprising a rotor supported for rotation upon an axis, at least two main conductive inductor members supported in spaced relation circumferentially about said axis, a conductive conveyor member carried by said rotor for movement thereof about said axis as said rotor rotates and in inductive relation successively to said inductor members, said conveyor member being of elongated form with the length thereof extending transversely of the circumferential direction of movement of said conveyor member, said conveyor member having a cross section transverse to said length thereof the circumferential outline of which enclosing said cross section is of continuously convex curvature, a plurality of auxiliary inductor members supported in each of the spaces between said main inductor members at opposite sides of said axis adjacent the path of movement of said conveyor member about said axis and in inductive relation to said conveyor member, said conveyor member being continuously insulated from said inductor members, means for maintaining said main inductor members at substantially different potentials, means for maintaining said auxiliary inductor members at the respective sides of said axis respectively at potentials varying progressively between the potentials of said main inductor members, a discharge terminal, an auxiliary terminal, means for connecting said auxiliary terminal to said conveyor member at the position in which said conveyor member is adjacent said inductor member of lower potential, and means for connecting said discharge terminal to said conveyor member at the position in which said conveyor member is adjacent said main inductor member of higher potential.

10. An electrostatic machine comprising a rotor supported for rotation upon an axis, at least two main conductive inductor members supported in spaced relation to each other circumferentially about said axis, a plurality of conductive conveyor members carried by said rotor in spaced relation to each other circumferentially about the axis of the rotor for movement thereof as said rotor rotates in inductive relation successively to said main inductor members, said conveyor members being of elongated form with the lengths thereof extending parallel to said axis of said rotor and having a cross section transverse to said length thereof the circumferential outline of which enclosing *said* cross section is of continuously convex curvature, a plurality of auxiliary conductive inductor members disposed in each of the spaces at opposite sides of said axis between said main inductor members adjacent the path of movement of said conveyor members and in inductive relation thereto, said auxiliary inductor members being of elongated form with the lengths thereof extending generally parallel to said axis of said rotor and having a cross section transverse to said lengths thereof the circumferential outline of which enclosing said cross section is of continuously convex curvature, said conveyor members being continuously insulated from said inductor members, means for maintaining said main inductor members at substantially different potentials, means for maintaining the auxiliary inductor members in each of said spaces at opposite sides of said axis at potentials varying from one to the other progressively between the potentials of said main inductor members, a discharge terminal, an auxiliary terminal, means for connecting said auxiliary terminal in succession to said conveyor members at the position in which said conveyor members are adjacent said inductor member of lower potential, and means for connecting said discharge terminal in succession to said conveyor members at the position in which said conveyor members are adjacent said main inductor member of higher potential.

11. An electrostatic machine comprising a rotor supported for rotation on an axis, at least two main conductive inductor members supported in spaced relation circumferentially about said axis, a plurality of conductive conveyor members carried by said rotor in spaced relation to each other about said axis for movement thereof as said rotor rotates in inductive relation successively to said inductor members, said conveyor members being of elongated form with the lengths thereof extending generally radially outwardly of the rotor with respect to said axis and having a cross section transverse to the length thereof the circumferential outline of which enclosing said cross section is of continuously convex curvature, auxiliary inductor members supported respectively in the spaces at opposite sides of said axis between said main inductor members adjacent the path of movement of said conveyor members about said axis and in inductive relation thereto, said conveyor members being continuously insulated from said inductor members, means for maintaining said main inductor members at substantially different potentials, means for maintaining in said auxiliary inductor members in each of said spaces a potential gradient varying progressively between the potentials of said main inductor members, a discharge terminal, an auxiliary terminal, means for connecting said conveyor members in succession to said auxiliary terminal at the position in which said conveyor members respectively are adjacent said inductor member of low potential, and means for connecting said conveyor members in succession to said discharge terminal [respectively] at the position in which said conveyor members *respectively* are adjacent said main inductor member of higher potential.

12. An electrostatic machine as defined in claim 11 in which said cross section of said radially extending conveyor members transversely of the radial extent thereof is of less dimension in the direction of circumferential movement thereof about said axis in the portion thereof inwardly disposed toward said axis than the dimension thereof in said circumferential direction in the portion thereof outwardly disposed with respect to said axis, said conveyor members along the length thereof being of substantially uniform dimension parallel to said axis.

13. An electrostatic machine as defined in claim 10 in which said main conductive inductor members are formed with the dimension thereof which extends circumferentially about said axis sufficient to span a plurality of said conductive conveyor members of said rotor.

14. An electrostatic machine as defined in claim 5 in which said conveyor member of elongated form has its cross section of continuously convex curvature constant along the length thereof.

15. An electrostatic machine as defined in claim 9 in which said auxiliary inductor members are of elongated form disposed with the length thereof extending transversely of the circumferential direction of movement of said conveyor member.

16. An electrostatic machine which comprises a plurality of elongated conductive conveyor bars supported in insulated relation and in spaced relation to each other circumferentially about an axis of rotation and having their lengths extending generally parallel to said axis to form a squirrel cage rotor rotatable on said axis, a contact member for each bar electrically connected thereto and rotatable therewith about said axis, a pair of brushes disposed in spaced relation to each other about said axis and for contact with said contact members in succession in the rotation of said rotor, a cylindrical stationary sleeve of insulating material coaxial with said axis of rotation, a plurality of elongated conductive inductor bars supported by said sleeve in spaced relation about and with their lengths extending parallel to said axis of rotation and adjacent the circumferential path of movement and in inductive relation to said conveyor members of said squirrel cage rotor, resistors connected between adjacent inductor bars circumferentially about said axis, and means for maintaining at substantially different potentials the conductive inductor bars which are adjacent the positions of said squirrel cage conveyor bars at which the [conductor] *contact* members electrically connected thereto are in contact with the respective brushes.

17. An electrostatic machine comprising a rotor supported for rotation on an axis, a plurality of conductive conveyor members carried by said rotor, said conveyor members being of elongated form with the lengths thereof extending generally radially outwardly of the rotor with respect to said axis and having a cross section transverse to the length thereof the circumferential outline of which enclosing said cross section is of continuously convex curvature, said conveyor members being arranged in a plurality of rows spaced along said axis, the conveyor members in each row being in spaced insulated relation to each other about said axis, a plurality of stationary flat rings of low conductibility material having opposite faces thereof generally parallel and supported at either side of each of said rows of conveyor members with said faces thereof in planes transversely of said axis of rotation, and at least two conductive inductor members carried by each of said flat rings at opposite sides of said axis, said inductor members having the faces thereof in planes transverse to said axis and of such extent and being so positioned that said conveyor members upon rotation of the rotor and moving between said rings pass in inductive relation to said inductor members.

18. An electrostatic machine which comprises a plurality of elongated conductive conveyor bars supported in insulated relation and in spaced relation to each other circumferentially about an axis of rotation and having their lengths extending generally parallel to said axis to form a squirrel cage rotor rotatable on said axis, a contact member for each bar electrically connected thereto and rotatable therewith about said axis, a pair of brushes in spaced relation to each other about said axis and for contact with said contact members in succession in the rotation of said rotor, a cylindrical stationary sleeve of low conductibility material coaxial with said axis of rotation, and means for maintaining at substantially different potentials the portions of said sleeve which are adjacent the positions of said squirrel cage conveyor bars at which the [conductor] *contact* members electrically connected thereto are in contact with the respective brushes.

19. An electrostatic machine comprising at least two main conductive inductor members supported in spaced relation to each other, a plurality of conductive conveyor members supported in insulated relation to each other and to said inductor members and in spaced relation to each other in the direction generally parallel to the spacing of said main inductor members, said inductor members as a unit and said conveyor members as a unit being supported for movement relative to each other to move said conveyor members into and out of inductive relation successively to said main inductor members, said conveyor members being of elongated form with the lengths thereof extending in the direction transverse to the direction of relative movement of said units and each having a cross section transverse to said length thereof the circumferential outline of which enclosing said cross section is continuously convex curvature, an auxiliary inductor member supported in the space between said main inductor members adjacent the path of relative movement of said units and for movement of said conveyor members in succession into and out of inductive relation to said auxiliary inductor member, means for maintaining said main inductor members at substantially different potentials, means for maintaining said auxiliary inductor member at an intermediate potential, a discharge terminal, an auxiliary terminal, means for connecting said auxiliary terminal to said conveyor members in succession at the position of each conveyor member in which it is adjacent said main inductor member of lower potential, and means for connecting said discharge terminal to said conveyor members in succession at the position of each conveyor member in which it is adjacent said main inductor member of higher potential.

NOËL FELICI.

REFERENCES CITED

The following references are of record in the file of this patent or in the original patent:

UNITED STATES PATENTS

| Number | Name | Date |
|---|---|---|
| 479,941 | Henry | Aug. 2, 1892 |
| 2,415,634 | Hill | Feb. 11, 1947 |

FOREIGN PATENTS

| Number | Country | Date |
|---|---|---|
| 165,413 | Great Britain | Dec. 27, 1922 |
| 432,277 | Germany | Aug. 3, 1926 |